(12) United States Patent
Ma et al.

(10) Patent No.: US 12,489,768 B2
(45) Date of Patent: Dec. 2, 2025

(54) ALARM MESSAGE PROCESSING METHOD, SYSTEM, DEVICE, AND MEDIUM

(71) Applicant: Beijing Volcano Engine Technology Co., Ltd., Beijing (CN)

(72) Inventors: Jun Ma, Beijing (CN); Jianxin Guo, Beijing (CN); Yuefeng Li, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/984,909

(22) Filed: Dec. 17, 2024

(65) Prior Publication Data
US 2025/0310355 A1  Oct. 2, 2025

(30) Foreign Application Priority Data
Mar. 29, 2024 (CN) .......................... 202410382432.7

(51) Int. Cl.
*H04L 9/40* (2022.01)
*G06N 20/00* (2019.01)
*H04L 41/069* (2022.01)

(52) U.S. Cl.
CPC ......... *H04L 63/1416* (2013.01); *G06N 20/00* (2019.01); *H04L 41/069* (2013.01)

(58) Field of Classification Search
None
See application file for complete search history.

(56) References Cited

U.S. PATENT DOCUMENTS

| | | | |
|---|---|---|---|
| 11,676,072 B1* | 6/2023 | Chandrasekharan | ... G06F 18/23 706/12 |
| 11,888,883 B2* | 1/2024 | Givental | ............ H04L 63/1433 |
| 2018/0367561 A1 | 12/2018 | Givental et al. | |
| 2019/0147354 A1* | 5/2019 | Gao | ................... G06Q 10/0639 706/11 |

(Continued)

FOREIGN PATENT DOCUMENTS

| | | |
|---|---|---|
| CN | 114707834 A | 7/2022 |
| CN | 115396280 A | 11/2022 |

(Continued)

OTHER PUBLICATIONS

European Patent Application No. 24222275.0; Extended European Search Report dated Feb. 20, 2025, 9 pages.

*Primary Examiner* — Christopher C Harris
(74) *Attorney, Agent, or Firm* — BakerHostetler

(57) ABSTRACT

This application provides an alarm message processing method. The method includes: obtaining first alarm data generated by a security detection module; matching the first alarm data to at least one piece of alarm feature information; obtaining at least one piece of target historical alarm data corresponding to target alarm feature information and alarm disposal information of the at least one piece of target historical alarm data; and generating first prompt information at least based on the first alarm data, the at least one piece of target historical alarm data, and the alarm disposal information of the at least one piece of target historical alarm data, and sending the first prompt information to a target model, and receiving first alarm disposal information for the first alarm data that is returned by the target model.

20 Claims, 3 Drawing Sheets

(56) References Cited

U.S. PATENT DOCUMENTS

| | | | | |
|---|---|---|---|---|
| 2019/0347282 A1* | 11/2019 | Cai | .................. | G06N 5/022 |
| 2020/0151326 A1* | 5/2020 | Patrich | .................. | G06F 21/554 |
| 2023/0098165 A1* | 3/2023 | Shi | .................. | G06F 11/0709 |
| | | | | 709/223 |
| 2023/0147934 A1 | 5/2023 | Eddin et al. | | |
| 2024/0119342 A1* | 4/2024 | Nixon | .................. | G06N 3/006 |
| 2024/0177054 A1* | 5/2024 | Li | .................. | G06N 20/00 |

FOREIGN PATENT DOCUMENTS

| | | |
|---|---|---|
| CN | 115941430 A | 4/2023 |
| CN | 116257410 A | 6/2023 |
| CN | 117149585 A | 12/2023 |
| CN | 117633495 A | 3/2024 |
| WO | WO 2020/215894 A1 | 10/2020 |

* cited by examiner

ALARM MESSAGE PROCESSING METHOD, SYSTEM, DEVICE, AND MEDIUM

CROSS-REFERENCE TO RELATED APPLICATION(S)

This application claims priority to Chinese Application No. 202410382432.7 filed on Mar. 29, 2024, the disclosure of which is incorporated herein by reference in its entirety.

FIELD

This application relates to the field of computer technologies and, in particular, to an alarm message processing method and system, an electronic device, and a computer-readable storage medium.

BACKGROUND

With the continuous development of computer technologies, security protection products for performing security detection are emerging. The security protection products may detect computers, hosts, and other computing devices or virtual operating environments such as containers, to ensure operating security. In actual application, the security protection products may include a cloud workload protection platform (CWPP), a host-based intrusion detection system (HIDS), endpoint detection and response (EDR), a container security platform (CSP), and the like.

SUMMARY

This application provides an alarm message processing method. The method can improve the operation efficiency and accuracy of alarm disposal performed by a security protection product. This application further provides a system, an electronic device, a computer-readable storage medium, and a computer program product corresponding to the method.

In a first aspect, this application provides an alarm message processing method. The method comprises:
  obtaining first alarm data generated by a security detection module;
  matching the first alarm data to at least one piece of alarm feature information, wherein one piece of alarm feature information corresponds to at least one piece of historical alarm data;
  in response to the first alarm data hitting target alarm feature information in the at least one piece of alarm feature information, obtaining at least one piece of target historical alarm data corresponding to the target alarm feature information and alarm disposal information of the at least one piece of target historical alarm data; and
  generating first prompt information at least based on the first alarm data, the at least one piece of target historical alarm data, and the alarm disposal information of the at least one piece of target historical alarm data, sending the first prompt information to a target model, and receiving first alarm disposal information for the first alarm data that is returned by the target model, where the first prompt information is used for instructing the target model to perform alarm disposal for the first alarm data.

In a second aspect, this application provides an alarm message processing system. The system comprises:
  a first obtaining module configured to obtain first alarm data generated by a security detection module;
  a matching module configured to match the first alarm data to at least one piece of alarm feature information, where one piece of alarm feature information corresponds to at least one piece of historical alarm data;
  a second obtaining module configured to in response to the first alarm data hitting target alarm feature information in the at least one piece of alarm feature information, obtain at least one piece of target historical alarm data corresponding to the target alarm feature information and alarm disposal information of the at least one piece of target historical alarm data; and
  a disposal module configured to generate first prompt information at least based on the first alarm data, the at least one piece of target historical alarm data, and the alarm disposal information of the at least one piece of target historical alarm data, send the first prompt information to a target model, and receive first alarm disposal information for the first alarm data that is returned by the target model, where the first prompt information is used for instructing the target model to perform alarm disposal for the first alarm data.

In a third aspect, this application provides an electronic device. The electronic device includes a processor and a memory. The processor and the memory communicate with each other. The processor is configured to execute instructions stored in the memory, to enable the electronic device to perform the alarm message processing method according to the first aspect or any implementation of the first aspect.

In a fourth aspect, this application provides a computer-readable storage medium. The computer-readable storage medium stores instructions. The instructions instruct an electronic device to perform the alarm message processing method according to the first aspect or any implementation of the first aspect.

In a fifth aspect, this application provides a computer program product including instructions. When the computer program product runs on an electronic device, the electronic device is enabled to perform the alarm message processing method according to the first aspect or any implementation of the first aspect.

This application may further perform further combination based on the implementations provided in the foregoing aspects, to provide more implementations.

BRIEF DESCRIPTION OF THE DRAWINGS

To describe the technical methods in the embodiments of this application more clearly, the following briefly describes the drawings used in describing the embodiments.

DETAILED DESCRIPTION OF EMBODIMENTS

Figure 1:
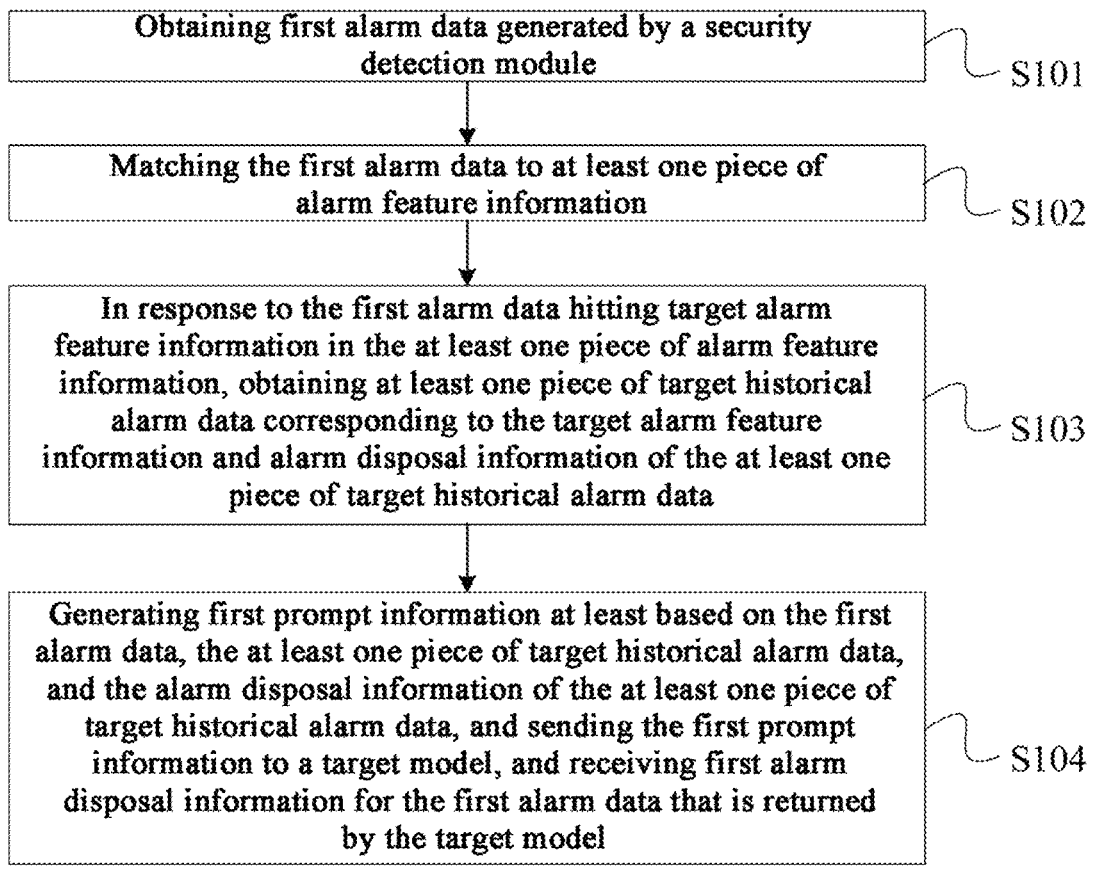
FIG. 1 is a flowchart of an alarm message processing method according to an embodiment of this application.

The terms "first" and "second" in the embodiments of this application are merely intended for a purpose of description, and shall not be understood as indicating or implying relative importance or implicitly indicating a quantity of indicated technical features. Therefore, a feature limited by "first" or "second" may explicitly or implicitly include one or more features.

Some technical terms involved in the embodiments of this application are first introduced.

With the continuous development of computer technologies, security protection products for performing security detection to ensure the operating security of computers, hosts, and other computing devices or virtual operating environments such as containers are emerging. The security protection products may perform security detection in various aspects for various operating scenarios. For example, the security protection product may be a cloud workload protection platform (CWPP), and the CWPP can perform detection for host security and network security. For another example, the security protection product may be a host-based intrusion detection system (HIDS), and the HIDS can perform security detection on the behavior and status of a computer system. For another example, the security protection product may be endpoint detection and response (EDR), and the EDR can perform security detection on the system-level behavior of an endpoint. For another example, the security protection product may be a container security platform (CSP), and the CSP can provide security detection in various aspects for a container.

When detecting an alarm event, the security protection product generates corresponding alarm information. The alarm information may include alarm data that generates the alarm event. A user (for example, a security operation personnel) may analyze and determine the alarm data, to form alarm disposal information, thereby completing alarm disposal. For example, the security operation personnel may determine, based on the alarm data, whether the alarm event is a false alarm. If the alarm event is not a false alarm, the security operation personnel may further provide a solution for disposing of the alarm event.

Considering that the security protection product generates a relatively large amount of alarm information, it is time-consuming and labor-intensive for the security operation personnel to perform alarm disposal, and the efficiency is relatively low. In the related art, a model (for example, a language model with a natural language processing capability) may be used for analyzing the alarm information.

However, because the security protection product may detect a complex and dynamic operating environment, the manner of performing alarm disposal by the model has relatively low accuracy.

The security protection product may generate a relatively large amount of alarm data. The security operation personnel need to spend a lot of time to screen the alarm data. For example, the security operation personnel need to spend a lot of time to verify the alarm data and record disposal information of each piece of alarm data, which is time-consuming and labor-intensive.

In the related art, a model (for example, a language model with a natural language processing capability) may be used for analyzing the alarm data. Specifically, the alarm data is sent to the model, and the model may perform identification and analysis on the alarm data, and give a result indicating whether the alarm event is a false alarm.

However, because the security protection product may detect a complex and dynamic operating environment, the model may inevitably have an "illusion problem", that is, the model may give some seemingly reasonable but actually wrong output results, resulting in relatively low accuracy of the alarm disposal information generated by the model.

In view of this, this application provides an alarm message processing method. In the method, first, first alarm data generated by a security detection module is obtained, and then the first alarm data is matched to at least one piece of alarm feature information, where one piece of alarm feature information corresponds to at least one piece of historical alarm data. In response to the first alarm data hitting target alarm feature information in the at least one piece of alarm feature information, at least one piece of target historical alarm data corresponding to the target alarm feature information and alarm disposal information of the at least one piece of target historical alarm data are obtained. Subsequently, first prompt information is generated at least based on the first alarm data, the at least one piece of target historical alarm data, and the alarm disposal information of the at least one piece of target historical alarm data, the first prompt information is sent to a target model, and first alarm disposal information for the first alarm data that is returned by the target model is received, where the first prompt information is used for instructing the target model to perform alarm disposal for the first alarm data.

In the method, in a process of performing alarm disposal by using the target model, the alarm data to be disposed is matched to the alarm feature information. If the alarm data to be disposed hits the target alarm feature information, the target alarm feature information corresponds to the target historical alarm data, and the target historical alarm data has been subjected to alarm disposal. The target historical alarm data and the alarm disposal information of the target historical alarm data are input to the target model, and the target model can generate more accurate disposal information for the current alarm data to be disposed by using information related to the target historical alarm data. When the method is applied to a security protection product, the security protection product can accurately perform alarm disposal, and the operation efficiency and accuracy of the security protection product are effectively improved.

To facilitate understanding of the technical solutions provided in the embodiments of this application, the following describes the technical solutions with reference to the drawings.

FIG. 1 is a flowchart of an alarm message processing method according to an embodiment of this application. The method specifically includes the following steps.

S101: Obtain first alarm data generated by a security detection module.

The first alarm data may be understood as alarm data to be disposed of. The first alarm data may result in an alarm event, where the alarm event may be understood as an event that may cause an operating risk.

The first alarm data may include a plurality of alarm fields. For example, the alarm data may include a command line field, a parent process command line field, a process group command line field, a process tree information field, a runtime link field, and an execution table of contents field.

In this embodiment of this application, the first alarm data may be generated by the security detection module. Specifically, the security detection module may be a module in a security protection product, for example, a module in a security protection product such as CWPP, HIDS, EDR, or CSP. The security detection module may perform security detection on operating data generated during an operation process of a computing device or a virtual operating environment, for example, perform security detection on operating data such as an operating log or network traffic. When the security detection module detects abnormal data in the operating data and the abnormal data may result in an alarm event, the security detection module may determine the abnormal data as the first alarm data. In this way, after detecting the first alarm data, the security detection module may obtain the first alarm data.

S102: Match the first alarm data to at least one piece of alarm feature information.

The alarm feature information, also referred to as alarm pattern information, in this embodiment of this application, one piece of alarm feature information may correspond to at least one piece of historical alarm data. In other words, the alarm feature information may be used for representing a specific feature of the at least one piece of historical alarm data corresponding to the alarm feature information, or representing a specific pattern that the at least one piece of historical alarm data corresponding to the alarm feature information conforms to. Wherein, the historical alarm data may be alarm data generated in a historical time period.

In other words, the alarm feature information may be information extracted from the at least one piece of historical alarm data corresponding to the alarm feature information and that is general for a specific feature or a specific pattern.

In this embodiment of this application, to improve a subsequent effect of using the alarm feature information to assist the target model, the at least one piece of historical alarm data corresponding to the alarm feature information may be alarm data that has been subjected to alarm disposal. For example, the historical alarm data may be manually disposed of by a user (for example, a security operation personnel), or may be automatically disposed of by the target model.

The at least one piece of alarm feature information may be stored in a feature information base. Specifically, for each piece of alarm feature information, the feature information base may store a correspondence between the alarm feature information and at least one piece of historical alarm data that is used to generate the alarm feature information, and store a correspondence between the alarm feature information and alarm disposal information of the at least one piece of historical alarm data. In this way, the corresponding at least one piece of historical alarm data and the alarm disposal information of the at least one piece of historical alarm data may be queried through the alarm feature information.

The alarm disposal information may be understood as information used for disposing of the alarm data. Specifically, the alarm disposal information may include at least one of alarm tag information or alarm attribution information.

The alarm tag information may be used for indicating a disposal tag of the alarm data, that is, a disposal result of the alarm data may be obtained through the alarm tag information. For example, the alarm tag information may be a false alarm, a real intrusion, a violation, or the like.

The alarm attribution information may be used for representing a reason for generating the disposal tag, that is, a reason for generating the disposal result of the alarm data may be obtained through the alarm attribution information. For example, when the alarm tag information is "false alarm", the alarm attribution information may be "The downloaded file is an installation package of influxdb, and does not include another abnormal behavior. No virus detection-related alarm is triggered. Therefore, it is determined that this database installation package downloading is a normal service behavior, and belongs to a false alarm".

After obtaining the first alarm data, the service side may match the first alarm data to the at least one piece of alarm feature information in the feature information base, to determine whether the first alarm data to be disposed of currently has a specific feature that the historical alarm data has, or whether the first alarm data to be disposed of currently has a specific pattern that the historical alarm data conforms to.

S103: In response to the first alarm data hitting target alarm feature information in the at least one piece of alarm feature information, obtain at least one piece of target historical alarm data corresponding to the target alarm feature information and alarm disposal information of the at least one piece of target historical alarm data.

During specific implementation, the first alarm data may be matched to the at least one piece of alarm feature information in different manners. In some embodiments, the service side may match the first alarm data to a regular expression corresponding to the at least one piece of alarm feature information. In other words, the alarm feature information may be stored in a form of the regular expression, and the regular matching rule is used for matching the first alarm data to the alarm feature information.

In this case, the service side may, in response to an alarm field in the first alarm data matching the regular expression corresponding to the target alarm feature information in the at least one piece of alarm feature information, obtain the at least one piece of target historical alarm data corresponding to the target alarm feature information and the alarm disposal information of the at least one piece of target historical alarm data.

It may be understood that because the alarm data may include a plurality of alarm fields, to improve the matching efficiency and the matching accuracy, the alarm feature information may be information extracted from a specific alarm field in the at least one piece of historical alarm data. In this way, the alarm fields of the first alarm data are matched to the alarm feature information, so that the at least one piece of target historical alarm data and the alarm disposal information of the at least one piece of target historical alarm data can be obtained.

In some other embodiments, the service side may separately calculate a text similarity between each alarm field of the first alarm data and the at least one piece of alarm feature information. In other words, when the alarm feature information is not stored in the form of the regular expression, the similarity calculation is used for matching the first alarm data to the alarm feature information.

In this case, the service side may, in response to there being the target alarm feature information with the text similarity meeting a first set condition, obtain the at least one piece of target historical alarm data corresponding to the target alarm feature information and the alarm disposal information of the at least one piece of target historical alarm data. For example, the first set condition may be that the text similarity is greater than a similarity threshold. In this way, the alarm fields of the first alarm data are matched to the alarm feature information, so that the at least one piece of target historical alarm data and the alarm disposal information of the at least one piece of target historical alarm data can be obtained.

The first alarm data hits the target alarm feature information, and the target alarm feature information corresponds to the at least one piece of target historical alarm data. Therefore, the first alarm data is similar to the at least one piece of target historical alarm data.

S104: Generate first prompt information based on at least the first alarm data, the at least one piece of target historical alarm data, and the alarm disposal information of the at least one piece of target historical alarm data, send the first prompt information to a target model, and receive first alarm disposal information for the first alarm data that is returned by the target model.

In this embodiment of this application, the target model is used for disposing of the first alarm data, to implement automatic generation of the alarm disposal information. The target model may be a language model with a natural language processing capability, and the target model can perform different types of natural language processing tasks. For example, the target model may be a deep learning model trained based on text data.

During specific implementation, the alarm disposal information may be generated by using the target model based on prompt learning technology. The first prompt information is generated, and the target model is instructed to generate the alarm disposal information by using the prompt capability of the first prompt information. The first prompt information may be used for instructing the target model to perform alarm disposal for the first alarm data.

In other words, the first prompt information may inform the target model that the first alarm data is similar to the at least one piece of target historical alarm data, and instruct the target model to perform alarm disposal for the first alarm data in combination with the at least one piece of target historical alarm data and the historical alarm disposal information of the at least one piece of target historical alarm data, to generate the first alarm disposal information.

For example, the first prompt information may be "Current alarm data is XXX, and a historical alarm status that satisfies a same piece of alarm feature information as current alarm data is as follows: Historical alarm data is XXX, alarm tag information of X pieces of the historical alarm data is false alarm, and alarm tag information of X pieces of the historical alarm data is real intrusion. Alarm attribution information is respectively XXX. Please give alarm tag information and alarm attribution information of current alarm data based on the historical alarm data, the alarm tag information of the historical alarm data, and the alarm attribution information of the historical alarm data".

In this way, in the process of generating the first alarm disposal information, the target model may learn from the alarm disposal information of the target historical alarm data similar to the first alarm data, to generate the first alarm disposal information with higher accuracy.

The case in which the first alarm data hits the target alarm feature information in the at least one piece of alarm feature information is described above. Next, the case in which the first alarm data does not hit the at least one piece of alarm feature information is described.

During specific implementation, in response to the first alarm data not hitting the at least one piece of alarm feature information, the service side may send second prompt information generated based on at least the first alarm data to the target model multiple times, and receive multiple pieces of second alarm disposal information for the first alarm data that is returned by the target model.

The first alarm data not hitting the at least one piece of alarm feature information indicates that there is no alarm feature information in the feature information base that matches the feature or pattern of the first alarm data. In this case, the target model cannot analyze the first alarm data by using the target historical alarm data. To avoid the target model from generating the second alarm disposal information with relatively low accuracy at a single time, the service side may use the target model to generate the multiple pieces of second alarm disposal information multiple times.

It may be understood that the target model may have a parameter for controlling the randomness of the model. When the parameter for controlling the randomness of the model is not 0, the same second prompt information is sent to the target model multiple times, and the target model may generate a plurality of different outputs, that is, the foregoing multiple pieces of second alarm disposal information.

In some possible implementations, the service side may first obtain auxiliary information, then generate the second prompt information based on at least the first alarm data and the auxiliary information, send the second prompt information to the target model multiple times, and receive the multiple pieces of second alarm disposal information for the first alarm data that is returned by the target model.

The auxiliary information may be used for assisting the target model in generating the second alarm disposal information. In this embodiment of this application, the auxiliary information may include at least one of first information obtained by querying by using the first alarm data as an index or second information related to an alarm event that generates the first alarm data.

For example, the service side may query, by using the first alarm data as an index, the alarm knowledge base for the first information related to the first alarm data, where the alarm knowledge base may store information related to security operation. For another example, the service side may query the alarm database for the second information related to the alarm event that generates the first alarm data, for example, alarm rule information, alarm context information, related asset information, and vulnerability information, where the alarm database may store information related to the alarm event.

The second prompt information may be used for instructing the target model to perform alarm disposal for the first alarm data. In other words, the second prompt information may inform the target model that the auxiliary information is related to the first alarm data, and instruct the target model to perform alarm disposal for the first alarm data in combination with the auxiliary information, to generate the second alarm disposal information.

For example, the second prompt information may be "Current alarm data is XXX, alarm context information is XXX, alarm rule information is XXX, and related asset and vulnerability information is XXX. It cannot be determined as a false alarm in XXX case. Please give alarm tag information and alarm attribution information of current alarm data".

In this way, the auxiliary information related to the first alarm data is obtained, and the second prompt information is input to the target model multiple times, so that the accuracy of the generated second alarm data can be improved to some extent when the first alarm data does not hit the alarm feature information.

Based on the foregoing content, this embodiment of this application provides an alarm message processing method. In the method, first, first alarm data generated by a security detection module is obtained, and then the first alarm data is matched to at least one piece of alarm feature information, where one piece of alarm feature information corresponds to at least one piece of historical alarm data. In response to the first alarm data hitting target alarm feature information in the at least one piece of alarm feature information, at least one piece of target historical alarm data corresponding to the target alarm feature information and alarm disposal information of the at least one piece of target historical alarm data are obtained. Subsequently, first prompt information is generated based on at least the first alarm data, the at least one piece of target historical alarm data, and the alarm disposal information of the at least one piece of target historical alarm data, the first prompt information is sent to a target model, and first alarm disposal information for the first alarm data that is returned by the target model is received, where the first prompt information is used for instructing the target model to perform alarm disposal for the first alarm data.

In the method, in the process of performing alarm disposal by using the target model, the alarm data to be disposed is matched to the alarm feature information. If the alarm data to be disposed hits the target alarm feature information, the target alarm feature information corresponds to the target historical alarm data, and the target historical alarm data has been subjected to alarm disposal. The target historical alarm data and the alarm disposal information of the target historical alarm data are input to the target model, and the target model can generate more accurate disposal information for the current alarm data to be disposed by using information related to the target historical alarm data. When the method is applied to a security protection product, the security protection product can accurately perform alarm disposal, and the operation efficiency and accuracy of the security protection product are effectively improved.

In the foregoing content, the first alarm data is matched to the alarm feature information, so that the target model can learn from the alarm disposal information of the target historical alarm data, to generate the first alarm disposal information for the first alarm data. In this embodiment of this application, the user is supported in feeding back alarm disposal information generated by the target model, and then the target model is optimized by using the feedback information.

During specific implementation, the service side may receive feedback information for the first alarm disposal information, and adjust a parameter of the target model according to the feedback information. The feedback information represents a determination result of a user for the first alarm disposal information.

In other words, in the process of performing alarm disposal by the user, when the first alarm data hits the alarm feature information, after the first alarm disposal information for the first alarm data is automatically generated by using the target model, the user may feedback the first alarm disposal information. For example, the user may feedback whether the first alarm disposal information generated by the target model is correct, and when the first alarm disposal information is incorrect, the user may further feedback correct alarm disposal information.

During specific implementation, the service side may provide a first control and a second control, where the first control indicates that the first alarm disposal information is correct, and the second control indicates that the first alarm disposal information is incorrect. In other words, after the target model generates the first alarm disposal information for the first alarm data, the first alarm disposal information may be presented to the user, and the control is provided to receive an operation fed back by the user and indicating whether the first alarm disposal information is correct.

For example, when the alarm tag information in the first alarm disposal information is "real intrusion", but the user determines that the actual alarm tag information of the first alarm data should be "false alarm", the second control may be triggered, to feedback to the service side that the target model generates incorrect alarm disposal information.

In response to a trigger operation on the second control, the service side may receive first modification information for the first alarm disposal information, and then determine the feedback information according to the first modification information.

In other words, after the user feeds back that the target model generates the incorrect first alarm disposal information, the user may correct the incorrect first alarm disposal information. In this case, the feedback information may be information indicating that the first alarm disposal information is incorrect, and the first modification information for the first alarm disposal information. In addition, the service side may update the incorrect first alarm disposal information according to the first modification information, for example, add the first modification information to the first alarm disposal information.

It may be understood that if the user triggers the first control, it indicates that the first alarm disposal information generated by the target model is fed back to the service side to be correct. In this case, the service side may store the first alarm disposal information, and the user does not need to perform a subsequent operation.

For the case in which the first alarm data does not hit the at least one piece of alarm feature information, this embodiment of this application also supports the user in feeding back a plurality of pieces of second alarm disposal information generated by the target model, and then optimizes the target model by using the feedback information.

During specific implementation, the service side may receive feedback information for the plurality of pieces of second alarm disposal information, and adjust a parameter of the target model according to the feedback information. The feedback information represents a determination result of a user for the second alarm disposal information.

In some possible implementations, the service side may receive ranking information for the second alarm disposal information that is confirmed to be correct in the plurality of pieces of second alarm disposal information, and/or receive information indicating that at least a part of the plurality of pieces of second alarm disposal information is confirmed to be incorrect. The ranking information may represent a preference degree of the user for the second alarm disposal information that is confirmed to be correct in the plurality of pieces of second alarm disposal information. In this way, the feedback information may include the ranking information and/or the information indicating that the at least the part of the plurality of pieces of second alarm disposal information is confirmed to be incorrect.

In other words, for the plurality of pieces of second alarm disposal information generated by the target model, because the target model cannot generate the alarm disposal information by using the target historical alarm data and the alarm disposal information of the target historical alarm data, compared with the case in which the first alarm data hits the target alarm feature information in the alarm feature information, the accuracy of the second alarm disposal information may be relatively low. Therefore, the user may first feedback whether the second alarm disposal information is correct. Further, the user may rank the second alarm disposal information that is confirmed to be correct, and correct the second alarm disposal information that is confirmed to be incorrect.

During specific implementation, the service side may provide a third control and a fourth control for each piece of the second alarm disposal information, where the third control indicates that the second alarm disposal information is correct, and the fourth control indicates that the second alarm disposal information is incorrect. In other words, after the target model generates the plurality of pieces of second alarm disposal information for the first alarm data, the plurality of pieces of second alarm disposal information may be presented to the user (for example, presented in a form of a list), and, and the the control is provided to receive an operation fed back by the user and indicating whether the plurality of pieces of second alarm disposal information is correct.

For at least one piece of the second alarm disposal information that triggers the third control, it indicates that the user feeds back to the service side that the at least one piece of the second alarm disposal information generated by the target model is correct. In this case, the user may further rank the at least one piece of the second alarm disposal information that is confirmed to be correct, and rank the second alarm disposal information that best conforms to the facts and that is most completely interpreted in top order, to form the ranking information.

This embodiment of this application does not limit a manner in which the user ranks the at least one piece of the second alarm disposal information that is confirmed to be correct. For example, the user may drag the second alarm disposal information, to implement the ranking of the at least one piece of the second alarm disposal information that is confirmed to be correct.

For the at least one piece of the second alarm disposal information that triggers the fourth control, it indicates that the user feeds back to the service side that the at least one piece of the second alarm disposal information generated by the target model is incorrect. In this case, the user may correct the at least one piece of the second alarm disposal information that is incorrect, to form second modification information.

Subsequently, the service side may receive the ranking information and/or the second modification information, and then determine the feedback information. In addition, the service side may update the at least one piece of the second alarm disposal information that is incorrect according to the second modification information, for example, add the second modification information to the second alarm disposal information.

The feedback information is received in the process of performing alarm disposal by the user, so that not only the alarm disposal is completed by using the target model, but also the service side can perform reinforcement learning from human feedback (RLHF) on the target model according to the feedback information, with no extra labor of the user.

In this way, the RLHF may be performed on the target model in the entire lifecycle of the target model. Compared with only performing the RLHF in the pre-training stage of the target model in the conventional technology, the inference capability of the target model for generating the alarm disposal information can be improved in a long term and continuously, and the inference stability of the target model is enhanced.

During specific implementation, the service side may train a reward model by using the feedback information as training data, where the reward model may be used for measuring an inference accuracy degree of the target model.

In this embodiment of this application, in combination with the scenario of using the target model to generate the alarm disposal information, the reward model may include at least one of a classification model used for determining whether alarm disposal information is correct or a ranking model used for ranking multiple pieces of alarm disposal information.

It may be understood that because the feedback information carries the determination of the user on whether the alarm disposal information generated by the target model is correct, the modification of the user on the incorrect alarm disposal information generated by the target model, and the ranking of the correct alarm disposal information generated by the target model for the alarm data that does not hit the alarm feature information, the trained reward model may have a capability of determining whether the alarm disposal information is correct or a capability of ranking the multiple pieces of alarm disposal information according to the preference of the user, by using the feedback information as the training data.

The parameter of the target model may be adjusted by using the trained reward model. For example, the service side may perform reinforcement learning on the target model by using a proximal policy optimization (PPO) algorithm, to adjust the parameter of the target model, thereby improving the inference accuracy degree of the target model.

In some embodiments, the service side may further generate alarm feature information by using the feedback information. A process of generating the alarm feature information is described below by using an example in which at least one piece of existing alarm feature information is stored in the feature information base.

The service side may first obtain a plurality of pieces of historical alarm data, where the plurality of pieces of historical alarm data do not hit the at least one piece of existing alarm feature information.

It may be understood that to enrich the quantity of alarm feature information in the feature information base, the service side may use the plurality of pieces of historical alarm data that does not hit the existing alarm feature information to generate new alarm feature information.

Then, the service side may determine a plurality of pieces of historical alarm disposal information for the plurality of pieces of historical alarm data. The plurality of pieces of historical alarm disposal information includes at least one of third alarm disposal information for the plurality of pieces of historical alarm data that is returned by the target model or fourth alarm disposal information obtained by updating the third alarm disposal information according to feedback information of the third alarm disposal information.

In other words, the service side may continuously obtain the alarm disposal information generated by the target model and the feedback information of the user for the alarm disposal information generated by the target model, to determine the plurality of pieces of historical alarm disposal information for the plurality of pieces of historical alarm data.

Furthermore, the service side may classify the plurality of pieces of historical alarm data according to at least one alarm event that generates the plurality of pieces of historical alarm data, to obtain a historical alarm data set of at least one category, and perform clustering on the historical alarm data set of each category according to at least one alarm field, to obtain a clustering result of the historical alarm data set of each category.

In other words, the service side may perform grouping on the plurality of pieces of historical alarm data, and group historical alarm data under a same alarm event into a group, and perform clustering on different fields of the historical alarm data in each group, to obtain a clustering result.

In response to there being a target clustering result meeting a second set condition in the clustering result, the service side may generate second alarm feature information according to the target clustering result, and store the generated alarm feature information in the feature information base.

In some possible implementations, the service side may determine a quantity of samples of each cluster in the clustering result for each said clustering result, and in response to there being a cluster with a quantity of samples greater than a set quantity threshold in the target clustering result, generate the alarm feature information according to the target clustering result, and store the generated alarm feature information in the feature information base.

Specifically, the service side may generate third prompt information based on at least one piece of historical alarm data comprised in the target clustering result, send the third prompt information to the target model, and receive the alarm feature information returned by the target model. The third prompt information may be used for instructing the target model to generate the alarm feature information that matches the at least one piece of historical alarm data comprised in the target clustering result.

For example, the third prompt information may be "Similar content appears XXX times in the XX alarm field in the historical alarm data, and the similar content is respectively XXX. Please construct a feature pattern/regular expression from the similar content, where the feature pattern/regular expression is required to match the similar content that appears in the XX alarm field, and there should be sufficient features, to avoid alarm loss caused by excessive erroneous matching". In this way, new alarm feature information is automatically extracted by using the target model.

Figure 2:
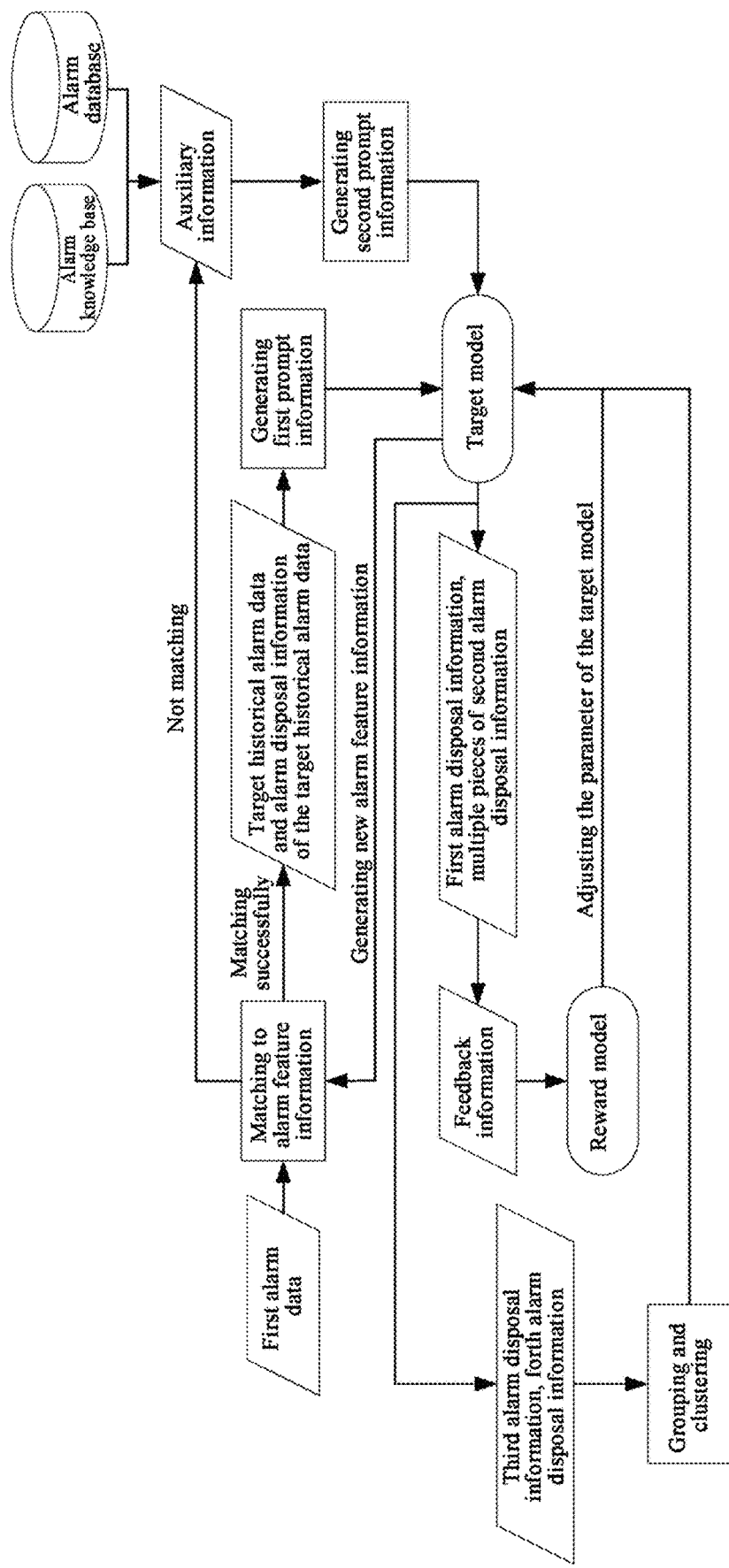
FIG. 2 is a flowchart of another alarm message processing method according to an embodiment of this application.

Next, a description is made by using an example in which the alarm message processing method is applied to a security protection product. FIG. 2 is a flowchart of another alarm message processing method. In this case, the service side may provide a CWPP, HIDS, EDR, CSP, or another security protection product.

The security protection product has a security detection module. In a process when a user uses the security protection product, the security detection module may detect an operating environment, and when detecting an alarm event, obtain first alarm data that generates the alarm event.

The first alarm data is matched to at least one piece of alarm feature information. When the matching succeeds, target historical alarm data corresponding to hit target alarm feature information and alarm disposal information of the target historical alarm data are obtained. When the matching does not succeed, auxiliary information is obtained from an alarm knowledge base and an alarm database of the security protection product.

Subsequently, alarm disposal is performed by using a target model. When the matching succeeds, first prompt information is be generated in combination with the first alarm data, the target historical alarm data, and the alarm disposal information of the target historical alarm data, and the first prompt information is sent to the target model, and first alarm disposal information returned by the target model is received. When the matching does not succeed, second prompt information is generated in combination with the first alarm data and the auxiliary information, and the second prompt information is sent to the target model multiple times, and multiple pieces of second alarm disposal information returned by the target model is received.

In the process of performing alarm disposal by using the security protection product, the security protection product may directly receive feedback information of the user. For example, by providing a control, the user may determine the correctness of the alarm disposal information generated by the target model. For another example, the user may also correct incorrect alarm disposal information. For another example, the user may also rank at least one piece of the second alarm disposal information that is confirmed to be correct according to the accuracy degree.

The foregoing received feedback information may be used for training the reward model, for example, training the classification model used for determining whether the alarm disposal information is correct, or training the ranking model used for ranking the plurality of pieces of alarm disposal information, to adjust the parameter of the target model by using the trained reward model. In this way, the target model is continuously performed RLHF during the use of the security protection product, to enhance the stability of alarm disposal performed by the security protection product.

Further, in the process of performing alarm disposal by using the security protection product, the service side may further perform grouping and clustering on the third alarm disposal information generated by the target model and the fourth alarm disposal information obtained by updating the third alarm disposal information according to the feedback information of the third alarm disposal information when the matching does not succeed, to extract and generate new alarm feature information, thereby enriching the feature information base of the security protection product, and improving the comprehensiveness of alarm disposal performed by the security protection product.

In this way, the method according to the present disclosure can effectively improve the security operation efficiency and accuracy of security protection products such as a container security platform, a cloud workload protection platform, endpoint detection and response, and a host-based intrusion detection system.

The alarm message processing method provided in the embodiments of this application is described in detail above with reference to FIG. 1 and FIG. 2. The following describes, with reference to the drawings, a system and a device provided in the embodiments of this application.

Figure 3:
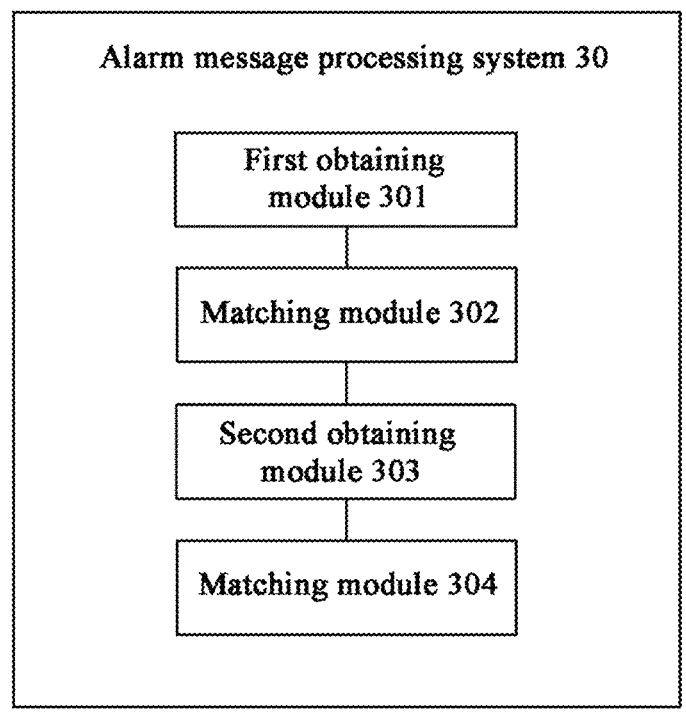
FIG. 3 is a diagram of a structure of an alarm message processing system according to an embodiment of this application.

FIG. 3 is a diagram of a structure of an alarm message processing system. The system 30 includes:
- a first obtaining module 301 configured to obtain first alarm data generated by a security detection module;
- a matching module 302 configured to match the first alarm data to at least one piece of alarm feature information, where one piece of alarm feature information corresponds to at least one piece of historical alarm data;
- a second obtaining module 303 configured to in response to the first alarm data hitting target alarm feature information in the at least one piece of alarm feature information, obtain at least one piece of target historical alarm data corresponding to the target alarm feature information and alarm disposal information of the at least one piece of target historical alarm data; and
- a disposal module 304 configured to generate first prompt information at least based on the first alarm data, the at least one piece of target historical alarm data, and the alarm disposal information of the at least one piece of target historical alarm data, send the first prompt information to a target model, and receive first alarm disposal information for the first alarm data that is returned by the target model, where the first prompt information is used for instructing the target model to perform alarm disposal for the first alarm data.

In some possible implementations, the alarm disposal information includes at least one of alarm tag information or alarm attribution information, where the alarm tag information indicates a disposal tag of alarm data, and the alarm attribution information represents a reason for generating the disposal tag.

In some possible implementations, the matching module 302 is specifically configured to:
match the first alarm data with a regular expression corresponding to the at least one piece of alarm feature information; and the second obtaining module 303 is specifically configured to:
in response to an alarm field in the first alarm data matching the regular expression corresponding to the target alarm feature information in the at least one piece of alarm feature information, obtain the at least one piece of target historical alarm data corresponding to the target alarm feature information and the alarm disposal information of the at least one piece of target historical alarm data.

In some possible implementations, the matching module 302 is specifically configured to:
separately calculate a text similarity between each alarm field of the first alarm data and the at least one piece of alarm feature information; and the second obtaining module 303 is specifically configured to:
in response to there being the target alarm feature information with the text similarity meeting a first set condition, obtain the at least one piece of target historical alarm data corresponding to the target alarm feature information and the alarm disposal information of the at least one piece of target historical alarm data.

In some possible implementations, the disposal module 304 is further configured to:
in response to the first alarm data not hitting the at least one piece of alarm feature information, send second prompt information generated based on at least the first alarm data to the target model multiple times, and receive multiple pieces of second alarm disposal information for the first alarm field that is returned by the target model, where the second prompt information is used for instructing the target model to perform alarm disposal for the first alarm data.

In some possible implementations, the disposal module 304 is specifically configured to:
obtain auxiliary information, where the auxiliary information includes at least one of first information obtained by querying by using the first alarm data as an index or second information related to an alarm event that generates the first alarm data;
generate the second prompt information based on at least the first alarm data and the auxiliary information; and
send the second prompt information to the target model multiple times, and receive multiple pieces of second alarm disposal information for the first alarm data that is returned by the target model.

In some possible implementations, the system 30 further includes an adjustment module, where the adjustment module is configured to:
receive feedback information for the first alarm disposal information, where the feedback information represents a determination result of a user for the first alarm disposal information; and
adjust a parameter of the target model according to the feedback information,
where the receiving the feedback information for the first alarm disposal information includes: providing a first control and a second control, where the first control indicates that the first alarm disposal information is correct, and the second control indicates that the first alarm disposal information is incorrect; in response to a trigger operation on the second control, receiving first modification information for the first alarm disposal information; and determining the feedback information according to the first modification information.

In some possible implementations, the adjustment module is further configured to:
receive feedback information for the multiple pieces of second alarm disposal information, where the feedback information represents a determination result of a user for the second alarm disposal information; and
adjust the parameter of the target model according to the feedback information.

In some possible implementations, the adjustment module is specifically configured to:
receive ranking information for the second alarm disposal information that is confirmed to be correct in the multiple pieces of second alarm disposal information; and/or receive information indicating that at least a part of the multiple pieces of second alarm disposal information is confirmed to be incorrect;
where the feedback information includes the ranking information and/or the information indicating that the at least the part of the multiple pieces of second alarm disposal information is confirmed to be incorrect, and the ranking information represents a preference degree of the user for the second alarm disposal information that is confirmed to be correct in the multiple pieces of second alarm disposal information.

In some possible implementations, the adjustment module is specifically configured to:
provide a third control and a fourth control for each piece of the second alarm disposal information, where the third control indicates that the second alarm disposal information is correct, and the fourth control indicates that the second alarm disposal information is incorrect; and
receive ranking information for at least one piece of the second alarm disposal information that triggers the third control, and/or receive second modification information for at least one piece of the second alarm disposal information that triggers the fourth control.

In some possible implementations, the adjustment module is specifically configured to:
train a reward model by using the feedback information as training data, where the reward model includes at least one of a classification model used for determining whether alarm disposal information is correct or a ranking model used for ranking multiple pieces of alarm disposal information, and the reward model is used for measuring an inference accuracy degree of the target model; and
adjust the parameter of the target model by using the trained reward model.

In some possible implementations, the feature information base stores at least one piece of existing alarm feature information, and the system 30 further includes a generation module configured to:
obtain a plurality of pieces of historical alarm data, where the plurality of pieces of historical alarm data do not hit the at least one piece of existing alarm feature information;
determine a plurality of pieces of historical alarm disposal information for the plurality of pieces of historical alarm data, where the plurality of pieces of historical alarm disposal information includes at least one of third alarm disposal information for the plurality of pieces of historical alarm data that is returned by the target model or fourth alarm disposal information obtained by updating the third alarm disposal information according to feedback information of the third alarm disposal information;

classify the plurality of pieces of historical alarm data according to at least one alarm event that generates the plurality of pieces of historical alarm data, to obtain a historical alarm data set of at least one category;

perform clustering on the historical alarm data set of each category according to at least one alarm field, to obtain a clustering result of the historical alarm data set of each category; and in response to there being a target clustering result meeting a second set condition in the clustering result, generate alarm feature information according to the target clustering result, and store the generated alarm feature information in the feature information base.

In some possible implementations, the generation module is specifically configured to:

determine a quantity of samples of each cluster in the clustering result for each said clustering result; and in response to there being a cluster with a quantity of samples greater than a set quantity threshold in the target clustering result, generate the alarm feature information according to the target clustering result, and store the generated alarm feature information in the feature information base.

In some possible implementations, the generation module is specifically configured to:

generate third prompt information based on at least one piece of historical alarm data comprised in the target clustering result; and send the third prompt information to the target model, and receive the alarm feature information returned by the target model, where the third prompt information is used for instructing the target model to generate the alarm feature information that matches the at least one piece of historical alarm data comprised in the target clustering result.

The alarm message processing system 30 according to this embodiment of this application may be configured to perform the method described in the embodiments of this application. For the foregoing and other operations and/or functions of the modules/units of the alarm message processing system 30, refer to corresponding processes of the methods in the embodiments shown in FIG. 1 or FIG. 2. For brevity, details are not described herein again.

This embodiment of this application further provides an electronic device. The electronic device is specifically configured to implement the functions of the alarm message processing system 30 in the embodiment shown in FIG. 3.

Figure 4:
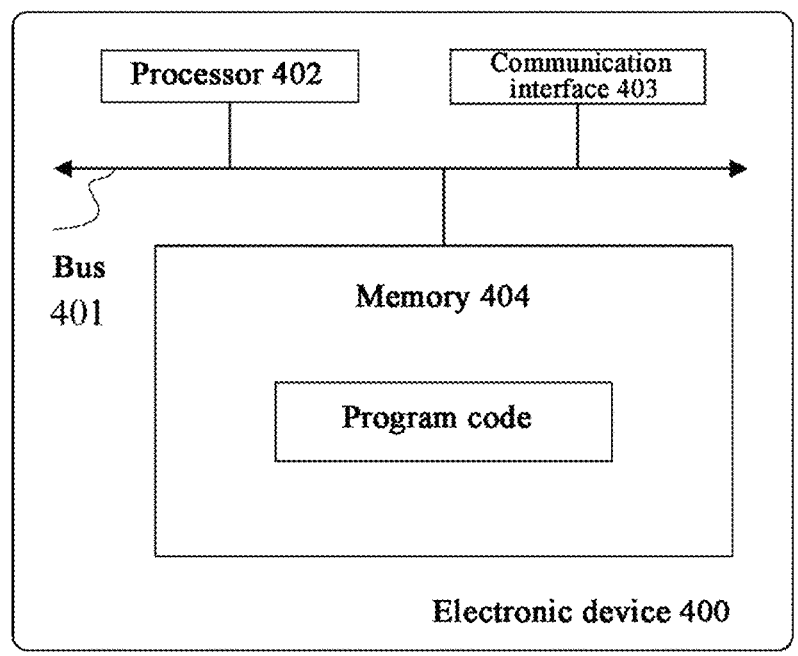
FIG. 4 is a diagram of a structure of an electronic device according to an embodiment of this application.

FIG. 4 is a diagram of a structure of an electronic device 400. As shown in FIG. 4, the electronic device 400 includes a bus 401, a processor 402, a communication interface 403, and a memory 404. The processor 402, the memory 404, and the communication interface 403 communicate with each other through the bus 401.

The bus 401 may be a peripheral component interconnect (PCI) bus or an extended industry standard architecture (EISA) bus. The bus may be classified as an address bus, a data bus, a control bus, and the like. For ease of representation, only one thick line is used for representation in FIG. 4, but it does not mean that there is only one bus or one type of bus.

The processor 402 may be any one or more of a central processing unit (CPU), a graphics processing unit (GPU), a microprocessor (MP), a digital signal processor (DSP), or the like.

The communication interface 403 is configured to communicate with an exterior. For example, the communication interface 403 may be configured to communicate with a terminal.

The memory 404 may include a volatile memory, for example, a random access memory (RAM). The memory 404 may further include a non-volatile memory, for example, a read-only memory (ROM), a flash memory, a hard disk drive (HDD), or a solid-state drive (SSD).

The memory 404 stores executable code, and the processor 402 executes the executable code to perform the alarm message processing method.

Specifically, when the embodiment shown in FIG. 3 is implemented, and the modules or units of the alarm message processing system 30 described in the embodiment of FIG. 3 are implemented by software, software or program code required to perform the functions of the modules/units in FIG. 3 may be partially or completely stored in the memory 404. The processor 402 executes the program code corresponding to the units stored in the memory 404, to perform the alarm message processing method.

This embodiment of this application further provides a computer-readable storage medium. The computer-readable storage medium may be any available medium that can be stored by a computing device or a data storage device such as a data center that includes one or more available media. The available medium may be a magnetic medium (for example, a floppy disk, a hard disk, or a tape), an optical medium (for example, a DVD), or a semiconductor medium (for example, a solid-state drive). The computer-readable storage medium includes instructions instructing a computing device to perform the alarm message processing method applied to the alarm message processing system 30.

This embodiment of this application further provides a computer program product. The computer program product includes one or more computer instructions. When the computer instructions are loaded and executed on a computing device, procedures or functions according to the embodiments of this application are completely or partially generated.

The computer instructions may be stored in the computer-readable storage medium, or transmitted from one computer-readable storage medium to another computer-readable storage medium. For example, the computer instructions may be transmitted from a website, a computer, or a data center to another website, computer, or data center in a wired manner (for example, a coaxial cable, an optical fiber, or a digital subscriber line (DSL)) or a wireless manner (for example, infrared, radio, and microwave).

When the computer program product is executed by a computer, the computer executes any one of the alarm message processing methods. The computer program product may be a software installation package. When any one of the alarm message processing methods needs to be used, the computer program product may be downloaded and executed on the computer.

The flowcharts and block diagrams in the drawings show possible architectures, functions, and operations of the system, method, and computer program product according to the embodiments of this application. In this regard, each block in the flowcharts or block diagrams may represent a module, a program segment, or part of code, and the module, the program segment, or the part of code includes one or more executable instructions for implementing specified logical functions. It is also to be noted that in some alternative implementations, functions marked in the blocks may occur in an order different from those marked in the drawings. For example, two blocks shown one after another may actually be performed substantially in parallel, or sometimes may be performed in a reverse order, depending on involved functions. It is also to be noted that each block in the block diagrams and/or flowcharts and a combination of blocks in the block diagrams and/or flowcharts may be implemented by a dedicated hardware-based system that performs specified functions or operations, or may be implemented by a combination of dedicated hardware and computer instructions.

The units involved in the embodiments of this application may be implemented by software or hardware. The name of a unit/module is not intended to limit the unit in a certain case.

The functions described herein above may be performed, at least partially, by one or more hardware logic components. For example, without limitation, exemplary types of hardware logic components that may be used include: field Programmable Gate Array (FPGA), Application Specific Integrated Circuit (ASIC), Application Specific Standard Product (ASSP), System on Chip (SOC), Complex Programmable Logical device (CPLD), etc.

In the context of the embodiments of the present application, a machine-readable medium may be a tangible medium that may include or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

It should be noted that the embodiments in this specification are described in a progressive manner. Each embodiment focuses on the differences from other embodiments, and the same or similar parts between the embodiments may be referred to each other. For the system or apparatus disclosed in the embodiments, because it corresponds to the method disclosed in the embodiments, the description thereof is relatively simple, and reference may be made to the description of the method for related parts.

It should be understood that in this application, "at least one (item)" refers to one or more, and "a plurality of" refers to two or more. "And/or" is used to describe an association relationship between associated objects, indicating that three relationships may exist. For example, "A and/or B" may indicate three cases: only A exists, only B exists, and both A and B exist at the same time, where A and B may be singular or plural. The character "/" generally indicates that the associated objects before and after the character are in an "or" relationship. "At least one of the following items" or similar expressions refer to any combination of these items, including any combination of a single item or a plurality of items. For example, "at least one of a, b, or c" may indicate: "a", "b", "c", "a and b", "a and c", "b and c", or "a, b, and c", where a, b, and c may be singular or plural.

It should be further noted that in this specification, the terms "first" and "second" are merely intended for a purpose of description, and shall not be understood as indicating or implying relative importance or implicitly indicating a quantity of indicated technical features. Therefore, a feature limited by "first" or "second" may explicitly or implicitly include one or more features.

The steps of the method or algorithm described in combination with the embodiments disclosed in this specification may be directly performed by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing description of the disclosed embodiments enables a person skilled in the art to implement or use this application. Various modifications to these embodiments are obvious to a a person skilled in the art, and the general principles defined herein may be implemented in other embodiments without departing from the spirit or scope of this application. Therefore, this application is not limited to the embodiments shown herein, but is intended to be consistent with the widest scope consistent with the principles and novel features disclosed herein.

We claim:

1. A method for improving performance accuracy of a target machine learning model, wherein the method comprises:

obtaining first alarm data generated by performing security detection on operating data collected during an operation process of a computing device or a virtual operating environment;

matching the first alarm data to at least one piece of alarm feature information, wherein one piece of alarm feature information corresponds to at least one piece of historical alarm data;

in response to the first alarm data hitting target alarm feature information in the at least one piece of alarm feature information, obtaining at least one piece of target historical alarm data corresponding to the target alarm feature information and alarm disposal information of the at least one piece of target historical alarm data;

generating first prompt information based at least on the first alarm data, the at least one piece of target historical alarm data, and the alarm disposal information of the at least one piece of target historical alarm data;

sending the first prompt information to the target machine learning model, wherein the first prompt information is configured to instruct the target machine learning model to generate first alarm disposal information based on the first alarm data in combination with the at least one piece of target historical alarm data and the alarm disposal information of the at least one piece of target historical alarm data for improving an accuracy of the first alarm disposal information;

receiving and outputting the first alarm disposal information generated by the target machine learning model;

receiving feedback information for the first alarm disposal information in a process of performing alarm disposal by a user, wherein the feedback information indicates whether the first alarm disposal information is correct; and continuously performing reinforcement learning from human feedback (RLHF) on the target machine learning model based on feedback information from users by using a proximal policy optimization algorithm to improve an inference accuracy degree of the target machine learning model.

2. The method according to claim 1, wherein the alarm disposal information comprises at least one of alarm tag information or alarm attribution information, wherein the alarm tag information indicates a disposal tag of alarm data, and the alarm attribution information represents a reason for generating the disposal tag.

3. The method according to claim 1, wherein matching the first alarm data to the at least one piece of alarm feature information comprises:

matching the first alarm data to a regular expression corresponding to the at least one piece of alarm feature information; and obtaining the at least one piece of the target historical alarm data corresponding to the target alarm feature information and the alarm disposal information of the at least one piece of target historical alarm data, in response to the first alarm data hitting the target alarm feature information in the at least one piece of alarm feature information, comprises:

in response to an alarm field in the first alarm data matching the regular expression corresponding to the target alarm feature information in the at least one piece of alarm feature information, obtaining the at least one piece of target historical alarm data corresponding to the target alarm feature information and the alarm disposal information of the at least one piece of target historical alarm data.

4. The method according to claim 1, wherein matching the first alarm data to the at least one piece of alarm feature information comprises:

for each alarm field of the first alarm data, calculating a text similarity with the at least one piece of alarm feature information respectively; and obtaining the at least one piece of the target historical alarm data corresponding to the target alarm feature information and the alarm disposal information of the at least one piece of target historical alarm data, in response to the first alarm data hitting target alarm feature information in the at least one piece of alarm feature information, comprises:

in response to there being the target alarm feature information with the text similarity meeting a first set condition, obtaining the at least one piece of target historical alarm data corresponding to the target alarm feature information and the alarm disposal information of the at least one piece of target historical alarm data.

5. The method according to claim 1, further comprising:

adjusting a parameter of the target machine learning model according to the feedback information, wherein receiving the feedback information for the first alarm disposal information comprises: providing a first control and a second control, wherein the first control indicates that the first alarm disposal information is correct, and the second control indicates that the first alarm disposal information is incorrect;

in response to a trigger operation on the second control, receiving first modification information for the first alarm disposal information; and determining the feedback information according to the first modification information.

6. The method according to claim 5, wherein adjusting the parameter of the target machine learning model according to the feedback information comprises:

training a reward model by using the feedback information as training data, wherein the reward model comprises at least one of a classification model used for determining whether alarm disposal information is correct or a ranking model used for ranking multiple pieces of alarm disposal information, and the reward model is used for measuring an inference accuracy degree of the target machine learning model; and adjusting the parameter of the target machine learning model by using the trained reward model.

7. The method according to claim 1, further comprising:

in response to the first alarm data not hitting the at least one piece of alarm feature information, obtaining auxiliary information, wherein the auxiliary information comprises at least one of: first information obtained by querying with the first alarm data as an index or second information associated with an alarm event that generates the first alarm data;

generating second prompt information based at least on the first alarm data and the auxiliary information, wherein the second prompt information is configured to instruct the target machine learning model to perform alarm disposal for the first alarm data;

sending the second prompt information to the target machine learning model multiple times, and receiving multiple pieces of second alarm disposal information for the first alarm data returned by the target machine learning model;

receiving feedback information for the multiple pieces of second alarm disposal information, wherein the feedback information represents a determination result of a user for the second alarm disposal information; and adjusting a parameter of the target machine learning model according to the feedback information.

8. The method according to claim 7, wherein receiving the feedback information for the multiple pieces of second alarm disposal information comprises:

receiving ranking information for the second alarm disposal information confirmed to be correct in the multiple pieces of second alarm disposal information; and/or receiving information confirming at least a part of the multiple pieces of second alarm disposal information to be incorrect, wherein the feedback information comprises the ranking information and/or the incorrect-confirming information, and the ranking information represents a preference degree of the user for the second alarm disposal information that is confirmed to be correct in the multiple pieces of second alarm disposal information.

9. The method according to claim 8, wherein receiving the ranking information for the second alarm disposal information that is confirmed to be correct in the multiple pieces of second alarm disposal information; and/or receiving the information confirming the at least the part of the multiple pieces of second alarm disposal information to be incorrect comprises:

providing a third control and a fourth control for each piece of the second alarm disposal information, wherein the third control indicates that the second alarm disposal information is correct, and the fourth control indicates that the second alarm disposal information is incorrect; and receiving ranking information for at least one piece of the second alarm disposal information that triggers the third control, and/or receiving second modification information for at least one piece of the second alarm disposal information that triggers the fourth control.

10. The method according to claim 1, wherein a feature information base stores at least one piece of existing alarm feature information, and the method further comprises:

obtaining multiple pieces of historical alarm data, wherein the multiple pieces of historical alarm data do not hit the at least one piece of existing alarm feature information;

determining multiple pieces of historical alarm disposal information for the multiple pieces of historical alarm data, wherein the multiple pieces of historical alarm disposal information comprises at least one of third alarm disposal information for the multiple pieces of historical alarm data returned by the target machine learning model or fourth alarm disposal information obtained by updating the third alarm disposal information according to feedback information of the third alarm disposal information;

classifying the multiple pieces of historical alarm data according to at least one alarm event that generates the multiple pieces of historical alarm data, to obtain a historical alarm data set of at least one category;

performing clustering on the historical alarm data set of each category according to at least one alarm field, to obtain a clustering result of the historical alarm data set of each category; and in response to there being a target clustering result meeting a second set condition in the clustering result, generating alarm feature information according to the target clustering result, and storing the generated alarm feature information in the feature information base.

11. The method according to claim 10, wherein generating the alarm feature information according to the target clustering result, and storing the generated alarm feature information in the feature information base, in response to there being the target clustering result meeting the second set condition in the clustering result, comprises:

determining a quantity of samples of each cluster in the clustering result for each said clustering result; and in response to there being a cluster with a quantity of samples greater than a set quantity threshold in the target clustering result, generating the alarm feature information according to the target clustering result, and storing the generated alarm feature information in the feature information base.

12. The method according to claim 10, wherein generating the alarm feature information according to the target clustering result comprises:

generating third prompt information based on at least one piece of historical alarm data comprised in the target clustering result; and sending the third prompt information to the target machine learning model, and receiving alarm feature information returned by the target machine learning model, wherein the third prompt information is used for instructing the target machine learning model to generate alarm feature information that matches the at least one piece of historical alarm data comprised in the target clustering result.

13. An electronic device, comprising:
a processor and a memory, the memory storing instructions, wherein the instructions, when executed by the processor, cause the electronic device to perform operations comprising:

obtaining first alarm data generated by performing security detection on operating data collected during an operation process of a computing device or a virtual operating environment;

matching the first alarm data to at least one piece of alarm feature information, wherein one piece of alarm feature information corresponds to at least one piece of historical alarm data;

in response to the first alarm data hitting target alarm feature information in the at least one piece of alarm feature information, obtaining at least one piece of target historical alarm data corresponding to the target alarm feature information and alarm disposal information of the at least one piece of target historical alarm data;

generating first prompt information based at least on the first alarm data, the at least one piece of target historical alarm data, and the alarm disposal information of the at least one piece of target historical alarm data;

sending the first prompt information to a target machine learning model, wherein the first prompt information is configured to instruct the target machine learning model to generate first alarm disposal information based on the first alarm data in combination with the at least one piece of target historical alarm data and the alarm disposal information of the at least one piece of target historical alarm data for improving an accuracy of the first alarm disposal information;

receiving and outputting the first alarm disposal information generated by the target machine learning model;

receiving feedback information for the first alarm disposal information in a process of performing alarm disposal by a user, wherein the feedback information indicates whether the first alarm disposal information is correct; and continuously performing reinforcement learning from human feedback (RLHF) on the target machine learning model based on feedback information from users by using a proximal policy optimization algorithm to improve an inference accuracy degree of the target machine learning model.

14. The device according to claim 13, wherein the alarm disposal information comprises at least one of alarm tag information or alarm attribution information, wherein the alarm tag information indicates a disposal tag of alarm data, and the alarm attribution information represents a reason for generating the disposal tag.

15. The device according to claim 13, wherein matching the first alarm data to the at least one piece of alarm feature information comprises:

matching the first alarm data to a regular expression corresponding to the at least one piece of alarm feature information; and obtaining the at least one piece of the target historical alarm data corresponding to the target alarm feature information and the alarm disposal information of the at least one piece of target historical alarm data, in response to the first alarm data hitting the target alarm feature information in the at least one piece of alarm feature information, comprises:

in response to an alarm field in the first alarm data matching the regular expression corresponding to the target alarm feature information in the at least one piece of alarm feature information, obtaining the at least one piece of target historical alarm data corresponding to the target alarm feature information and the alarm disposal information of the at least one piece of target historical alarm data.

16. The device according to claim 13, wherein matching the first alarm data to the at least one piece of alarm feature information comprises:
for each alarm field of the first alarm data, calculating a text similarity with the at least one piece of alarm feature information respectively; and
obtaining the at least one piece of the target historical alarm data corresponding to the target alarm feature information and the alarm disposal information of the at least one piece of target historical alarm data, in response to the first alarm data hitting target alarm feature information in the at least one piece of alarm feature information, comprises:
in response to there being the target alarm feature information with the text similarity meeting a first set condition, obtaining the at least one piece of target historical alarm data corresponding to the target alarm feature information and the alarm disposal information of the at least one piece of target historical alarm data.

17. The device according to claim 13, the operations further comprising:
adjusting a parameter of the target machine learning model according to the feedback information,
wherein receiving the feedback information for the first alarm disposal information comprises: providing a first control and a second control, wherein the first control indicates that the first alarm disposal information is correct, and the second control indicates that the first alarm disposal information is incorrect;
in response to a trigger operation on the second control, receiving first modification information for the first alarm disposal information; and
determining the feedback information according to the first modification information.

18. The device according to claim 13, the operations further comprising:
in response to the first alarm data not hitting the at least one piece of alarm feature information, obtaining auxiliary information, wherein the auxiliary information comprises at least one of: first information obtained by querying with the first alarm data as an index or second information associated with an alarm event that generates the first alarm data;
generating second prompt information based at least on the first alarm data and the auxiliary information, wherein the second prompt information is configured to instruct the target machine learning model to perform alarm disposal for the first alarm data;
sending the second prompt information to the target machine learning model multiple times, and receiving multiple pieces of second alarm disposal information for the first alarm data returned by the target machine learning model;
receiving feedback information for the multiple pieces of second alarm disposal information, wherein the feedback information represents a determination result of a user for the second alarm disposal information; and
adjusting a parameter of the target machine learning model according to the feedback information.

19. The device according to claim 18, wherein receiving the feedback information for the multiple pieces of second alarm disposal information comprises:
receiving ranking information for the second alarm disposal information confirmed to be correct in the multiple pieces of second alarm disposal information; and/or
receiving information confirming at least a part of the multiple pieces of second alarm disposal information to be incorrect,
wherein the feedback information comprises the ranking information and/or the incorrect-confirming information, and the ranking information represents a preference degree of the user for the second alarm disposal information that is confirmed to be correct in the multiple pieces of second alarm disposal information.

20. A non-transitory computer-readable storage medium, wherein the non-transitory computer-readable storage medium comprises computer-executable instructions, wherein the computer-executable instructions, when executed by one or more computer processors, cause the one or more computer processors to perform operations comprising:
obtaining first alarm data generated by performing security detection on operating data collected during an operation process of a computing device or a virtual operating environment;
matching the first alarm data to at least one piece of alarm feature information, wherein one piece of alarm feature information corresponds to at least one piece of historical alarm data;
in response to the first alarm data hitting target alarm feature information in the at least one piece of alarm feature information, obtaining at least one piece of target historical alarm data corresponding to the target alarm feature information and alarm disposal information of the at least one piece of target historical alarm data;
generating first prompt information based at least on the first alarm data, the at least one piece of target historical alarm data, and the alarm disposal information of the at least one piece of target historical alarm data;
sending the first prompt information to a target machine learning model, wherein the first prompt information is configured to instruct the target machine learning model to generate first alarm disposal information based on the first alarm data in combination with the at least one piece of target historical alarm data and the alarm disposal information of the at least one piece of target historical alarm data for improving an accuracy of the first alarm disposal information;
receiving and outputting the first alarm disposal information generated by the target machine learning model;
receiving feedback information for the first alarm disposal information in a process of performing alarm disposal by a user, wherein the feedback information indicates whether the first alarm disposal information is correct; and
continuously performing reinforcement learning from human feedback (RLHF) on the target machine learning model based on feedback information from users by using a proximal policy optimization algorithm to improve an inference accuracy degree of the target machine learning model.

* * * * *